Aug. 22, 1939.  J. A. ARVANITIS  2,170,512
MEAT CUTTER
Filed Aug. 20, 1937  4 Sheets-Sheet 1
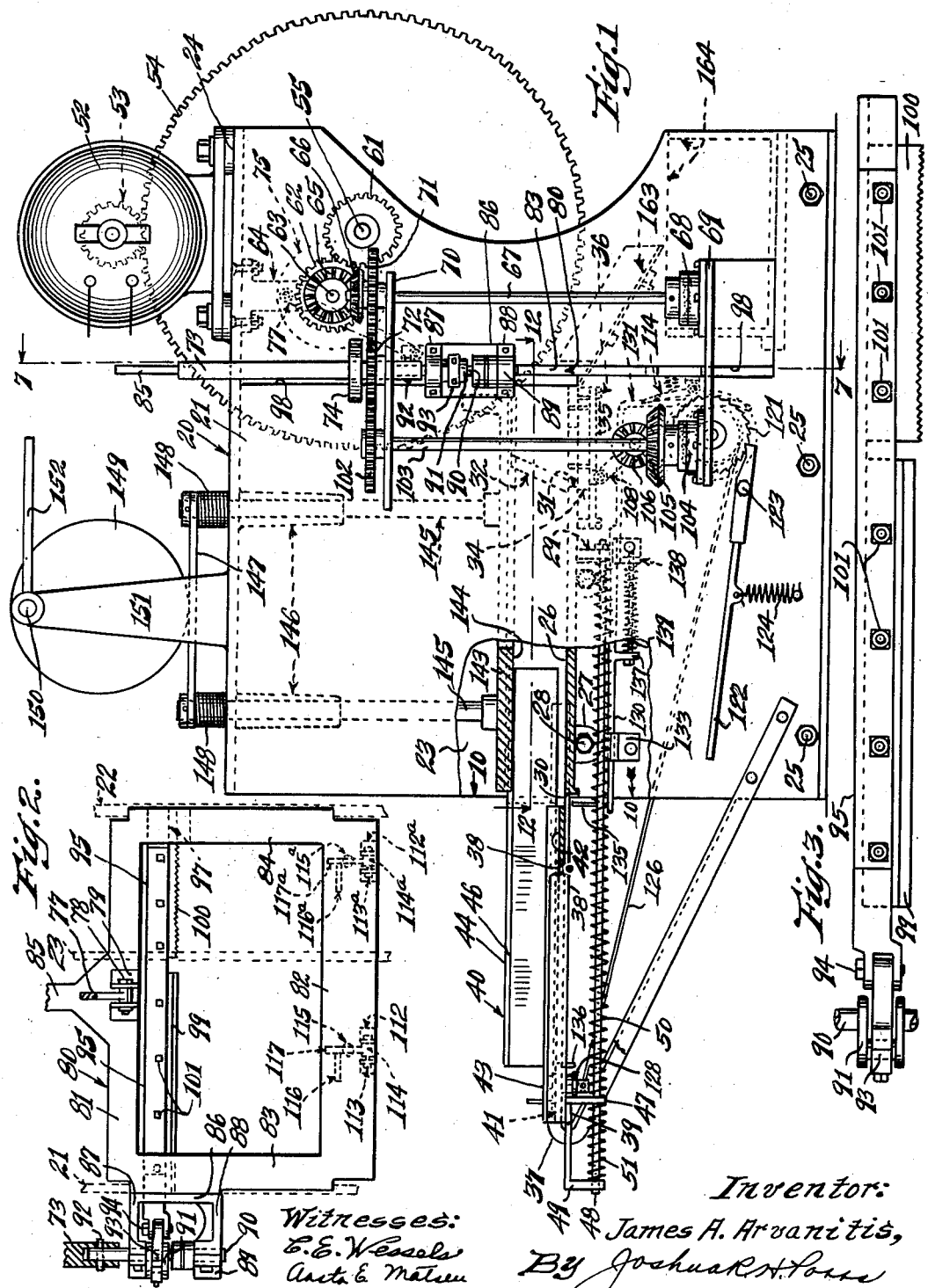
Inventor:
James A. Arvanitis,
By Joshua R. H. Potts
his Attorney.

Aug. 22, 1939.  J. A. ARVANITIS  2,170,512
MEAT CUTTER
Filed Aug. 20, 1937    4 Sheets-Sheet 2
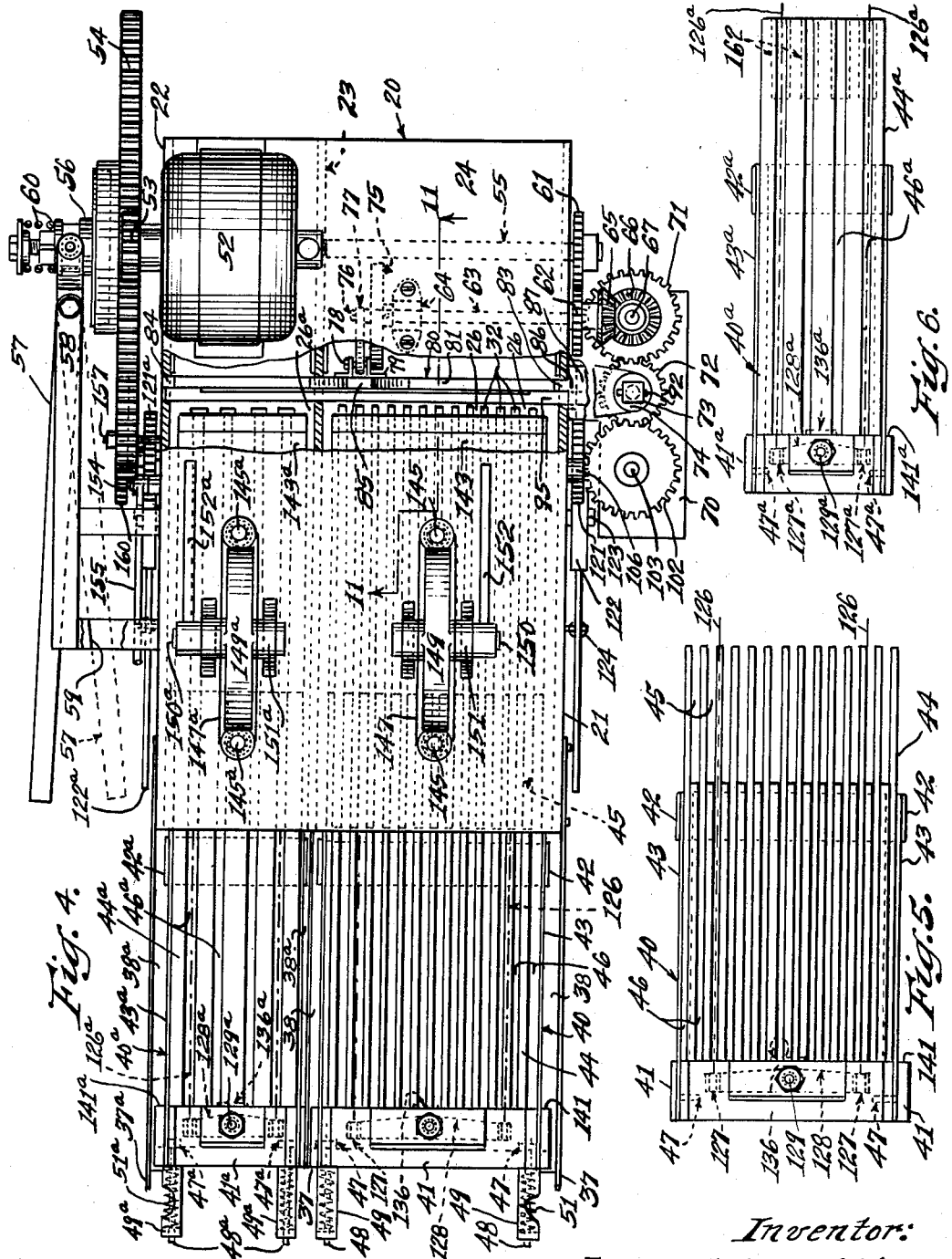
Witnesses:
C. E. Wessels
Aasta E. Matsen
Inventor:
James A. Arvanitis,
By Joshua R. H. Potts
his Attorney.

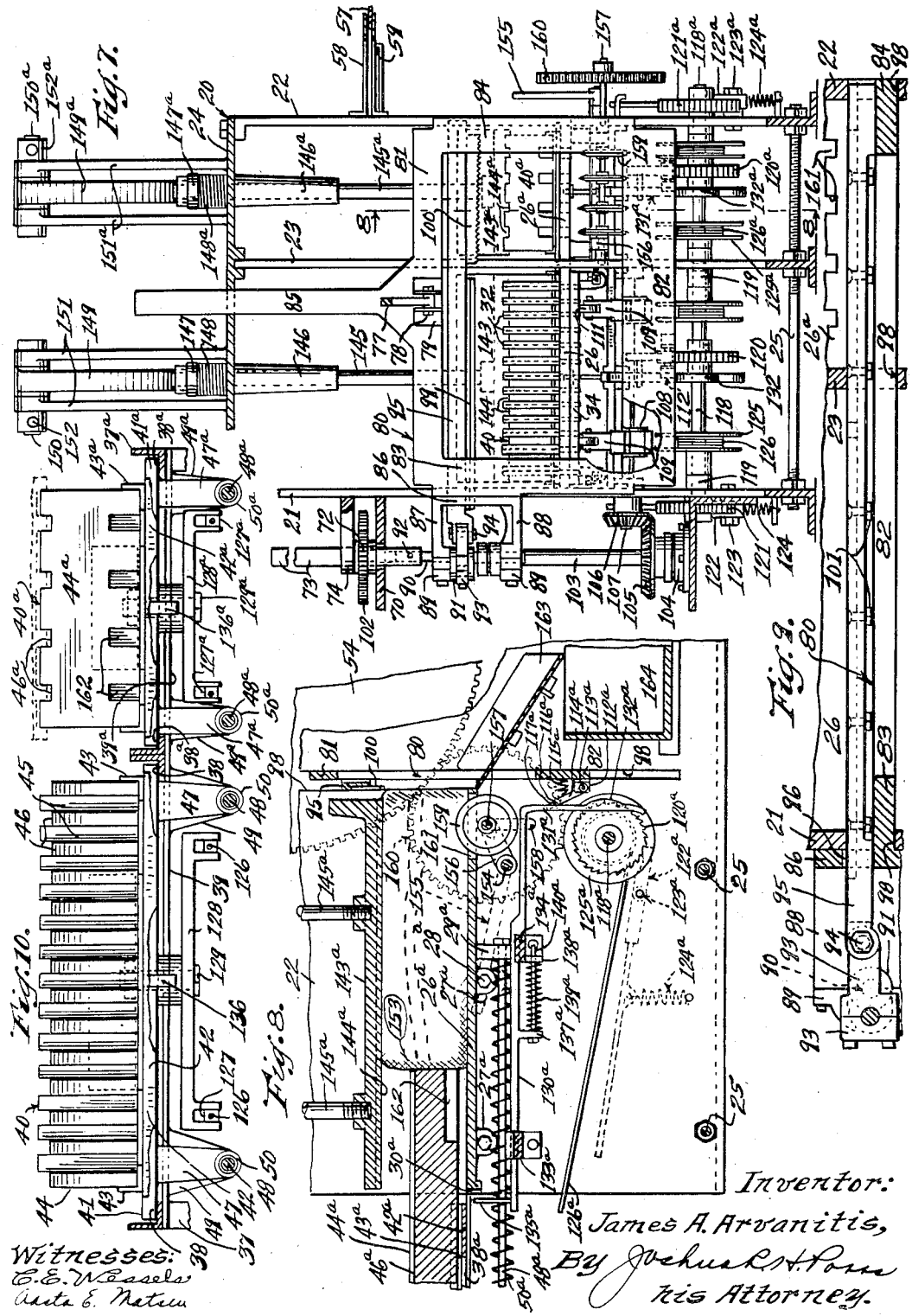

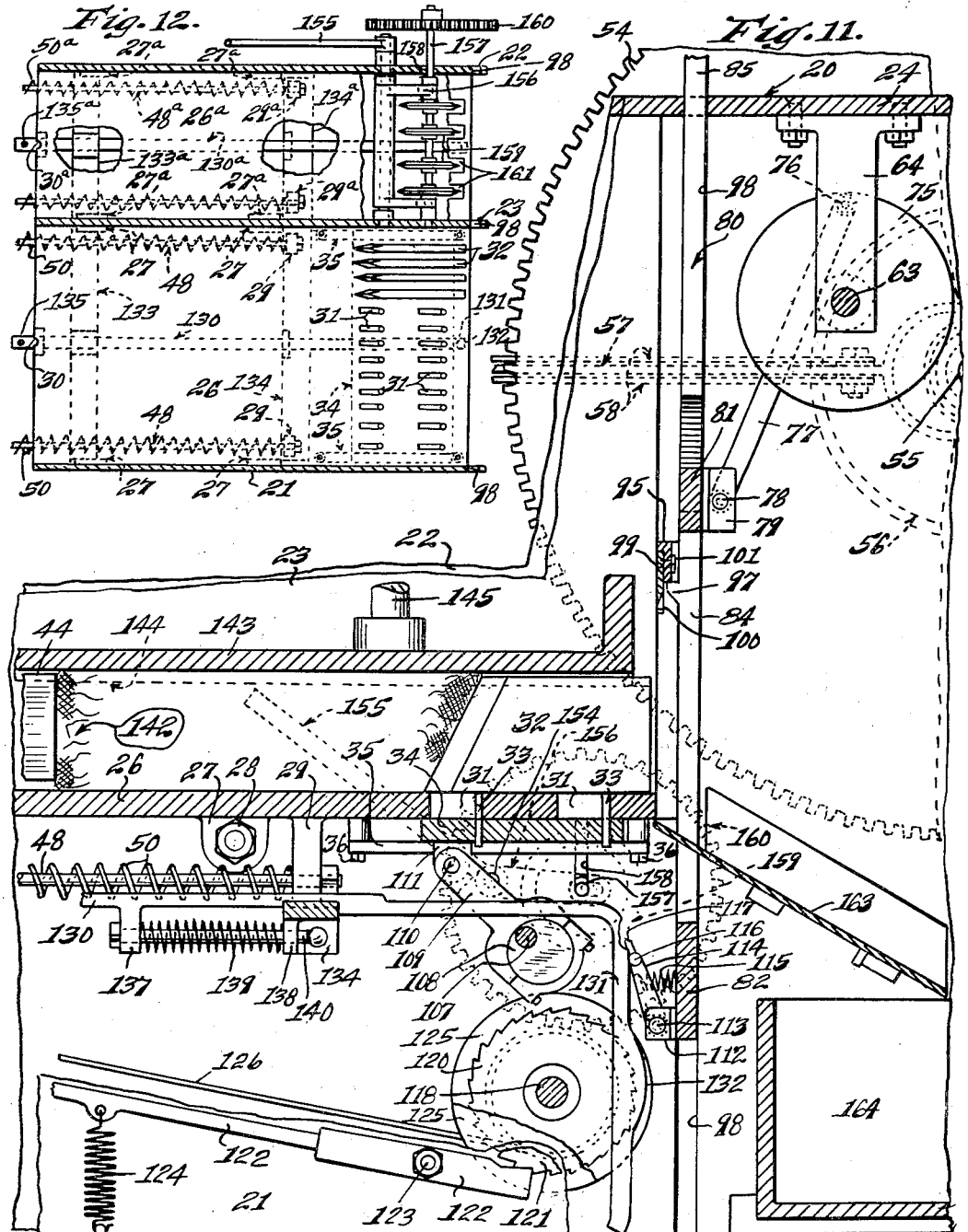

Patented Aug. 22, 1939

2,170,512

UNITED STATES PATENT OFFICE 2,170,512

MEAT CUTTER

James A. Arvanitis, Mason City, Iowa

Application August 20, 1937, Serial No. 160,042

5 Claims. (Cl. 146—78)

This invention relates to machines for cutting and slicing meat products and the like.

The general object of this invention is to provide an improved machine for cutting and slicing meat or other allied types of food products.

Other related objects and advantages will appear and be brought out more fully in the following description, reference being had to the accompanying drawings, wherein, Fig. 1 is a side view, partly broken away, of a machine embodying my invention;

Fig. 2 is a separate view in elevation of the reciprocating frame element thereof;

Fig. 3 is an enlarged elevation of the reciprocating knife element shown in Fig. 2;

Fig. 4 is a plan view, partly broken away, of the machine shown in Fig. 1;

Fig. 5 is a plan view of one of the advancing frame members;

Fig. 6 is a similar view of an auxiliary advancing frame;

Fig. 7 is a sectional elevation taken along the lines 7—7 of Fig. 1;

Fig. 8 is a sectional elevation taken along the line 8—8 of Fig. 7, illustrating the circular knives in operative position;

Fig. 9 is a plan view of the subject matter of Fig. 3 and associated parts;

Fig. 10 is a sectional elevation taken along the line 10—10 of Fig. 1 showing the advancing frames in retracted position;

Fig. 11 is a sectional elevation taken along the line 11—11 of Fig. 4;

Fig. 12 is a plan view, partly broken away, illustrating the longitudinal cutting knives; and Fig. 13 is a separate prospective view of a modified form of one of the cutter elements.

Referring more particularly to the drawings and especially to Figs. 1 and 11, I show a cutting and slicing machine 20 comprising a frame having a right hand frame member 21, a left hand frame member 22 and an intermediate frame member 23, the latter substantially forming compartments with frame members 21 and 22, said frame members being secured together by a top or platform 24 and tie rods 25 suitably secured thereto. A right hand supporting table 26 is supported by the frame members 21 and 23 by forward ears 27 and bolts 28. A pair of lugs 29 depend downwardly from table 26 for a purpose to be hereinafter more fully explained. Similarly, a left hand supporting table 26a having forward ears 27a is secured by bolts 28a to frame members 22 and 23. Notch 30 is provided in the forward end of table 26 and a notch 30a is similarly provided in table 26a (Fig. 12) for a purpose to be hereinafter explained.

A plurality of elongated apertures 31 are formed in the rear portion of table 26, and a plurality of reciprocating cutting knives 32 are supported by pairs of stud pins 33 adapted to extend through apertures 31 and are supported by reciprocating plate 34 which is slidably supported by a pair of bearing bars 35 which are secured to the under side of table 26 by bolts 36. A pair of V-shaped angle members 37 are supported at their ends to frame members 21 and 23 respectively and have a track portion 38 and a transverse brace portion 39 and, similarly, a pair of angle members 37a are supported to frame members 22 and 23 and have track portion 38a and transverse brace portion 39a. An advancing frame 40 is supported by front cross plate 41 and a rear cross plate 42, plates 41 and 42 being secured to a pair of angle members 43 adapted for slidable support in track 38. An advancing block 44 is suitably secured to frame 40 and is provided with a plurality of slots 45 in the rear portion and recesses 46 in the top thereof. An advancing frame 40a is supported by front cross plate 41a and a rear cross plate 42a, plates 41a and 42a being secured to a pair of angle members 43a adapted for slidable support in track 38a. An advancing block 44a is suitably secured to frame 40a and is provided with a plurality of slots 45a in the rear portion and recesses 46a in the top thereof.

A pair of lugs 47 depend downwardly from cross plate 41 and each has an aperture for a rod 48 and secured at the rear end by lug 29 depending from table 26 and at the forward end by bracket 49 secured to cross brace 39. A compression spring 50 is mounted on rod 48 and sets against lugs 29 and 47, and a cushion spring 51 is similarly located between lug 47 and bracket 49. Similarly, a pair of lugs 47a depend downwardly from cross plate 41 and each has an aperture for rod 48a and secured at the rear end by lug 29 and at the forward end by bracket 49a secured to brace 39. A compression spring 50a is mounted on rod 48a and sets against lugs 29a and 47a, and a cushion spring 51a is similarly located between lugs 47a and bracket 49a.

A motor 52 is suitably mounted on top 24 and has a driving pinion 53 in engagement with a clutch gear 54 which is loosely mounted on a main shaft 55 and has a clutch disc flange or splined collar 56 keyed or splined thereto. A clutch operating arm or lever 57 is pivoted to a bracket 58 having an abutment 59 adapted to serve as a latch for operating arm 57. A clutch spring 60 is suitably positioned between clutch disc 56 and a collar secured to shaft 55. Shaft 55 is further provided with a gear 61 which meshes with a gear 62 on a control shaft 63 suitably mounted on frame member 21 and a bearing post 64 suspended from top 24. A pivot gear 65 is secured to shaft 63 and meshes with a bevel gear 66 on a vertical shaft 67, the lower end of which is supported by thrust bearing 68 and a flanged bracket 69 secured on frame member 21. A guide bracket 70 is secured to member 21 and serves as a guide for shaft 67 and a support for a gear 71, also secured to shaft 67.

A pinion 72 meshes with and is driven by gear 71 and is slidably mounted on a square shaft 73. An upper guide bracket 74 for gear 72 is also suitably secured to frame 21. Crank disc 75 is mounted on shaft 63 and has a crank pin 76 pivotally connected to one end of link 77, the other end of which is pivotally connected to a stud pin 78 and a bracket 79 is secured to a vertically oscillatory or reciprocatory frame 80. (Figs. 2 and 11). Frame 80 has a top rail 81, a bottom rail 82, a right hand side rail 83, a left hand side rail 84 and a top extension 85. Rails 83 and 84 and extension 85 serve as guides for the vertical movement of the frame. An extension guide member 86 is secured to side rail 83 and is formed with an upper bearing member 87 and a lower bearing member 88, members 87 and 88 being provided with adjustable bearing blocks 89 in which a crank shaft 90 is retained. Shaft 90 has a crank 91 and is secured by pin 92 to shaft 73. A crank link 93 is connected by a pivot 94 to a cross cutter frame 95 which extends through an aperture 96 in guide member 86 and is supported at the extreme end by bearing lug 97 on side rail 84. (Fig. 11.) Appropriate slots 98 are formed in frame members 21, 22 and 23 to permit the cutter frame 95 to extend therethrough. A knife blade 99 and a saw blade 100 are secured as by nuts 101 to frame 95.

A gear 102 is partially supported by bracket 70 and meshes with and is driven by pinion 72. Gear 102 is secured to and drives a vertical shaft 103, which is mounted between brackets 69 and 70. Shaft 103 is provided with a thrust bearing 104 mounted on bracket 69. A bevel gear 105 is secured to and driven by shaft 103 and meshes with and drives a bevel gear 106 connected to a countershaft 107 suitably supported by bearings between frame members 21 and 23. (Fig. 11.) A pair of eccentric cranks 108 are secured to shaft 107 and oscillate a pair of links 109, each link having a pivot connection 110 with a lug 111 secured on the underside of reciprocating plate 34. A bracket 112 is secured on the forward face of bottom rail 82 and provides a pivot 113 for a pawl 114, there being a spring 115 urging pawl 114 outwardly from rail 82. Pawl 114 has a sidewardly extending pin 116 and a pointed abutment end 117. A shaft 118 is rotatable in bearings 119 mounted on frame members 21 and 23 and carries ratchet wheel 120 adapted to be engaged and actuated by abutment 117 of pin 116 whereby each time frame 80 is raised from its lowermost position, shaft 118 will be rotated a few degrees. A locking ratchet wheel 121 is mounted on the free end of shaft 118 and is adapted to be engaged by a latch lever 122 pivoted at 123 on frame 21, lever 122 being provided with a spring 124 for normally retaining the latch of lever 122 in engagement with ratchet wheel 121. A pair of drums 125 are secured on shaft 118 and each drum is partially wound with a cable 126, the free end of which is secured to a pivoted cable clamp 127 pivoted in an end of an arm 128, the latter being pivoted at its center at 129 to cross plate 41 of advancing frame 40.

A pawl releasing lever 130 has a downwardly extending arm 131 provided with a cam surface 132 and is supported by guides 133 and 134 secured between frame members 21 and 23 and upwardly extending pin 135 at the forward end of lever 130 is adapted to move into notch 30 when actuated by lug 136 on plate 41 of advancing frame 40. Lug 137 is provided on lever 130 and a lug 138 is provided on guide 134, and a compression spring 139 is positioned on guide rod 140 which is supported by lugs 137 and 138. Frame member 40 has an abutment edge 141 by which the forward movement of the advancing frame 40 is limited.

A bracket 112a is secured on rail 82 similarly to bracket 112 and the elements numbered 112 to 141 are duplicated for the advancing frame 40a by similar elements numbered 112a to 141a inclusive, the latter being positioned between frame members 22 and 23, the former being between frame members 21 and 23 as described hereinabove.

In Fig. 11 I show an article of food 142, such as meat, which is to be operated upon by the machine, the meat being held on supporting table 26 under pressure from a hold plate 143, the underside of which is formed with a number of ribs 144, plate 143 being maintained under a pressure from suspension rods 145 which are held in position by tubular guide members 146 secured to top 24, the upper ends of rods 145 being secured to a pressure plate 147, there being a compression or contractile spring 148 on each rod 145 above top 24 and below plate 147. An eccentric cam disc 149 is secured to a shaft 150 which is appropriately supported by bearing brackets 151 mounted on top 24. Operating arm 152 is secured to shaft 150 by which arrangement it will be apparent that the force applied to arm 152, either manually or in any other suitable manner, will be transmitted through disc 149, plate 147, rods 145, to plate 143 and meat 142 during the cutting and slicing operations. A similar hold down plate 143a is provided for supporting table 26a and parts numbered 143 to 152 are duplicated by the parts numbered 143a to 152a inclusive.

In Fig. 8 I show an article of food 153, which may be a meat product containing bones or the like, positioned on table 26a. A shaft 154 is supported between frame members 22 and 23 and is provided with a rock arm or handle 155 and a pair of rock arms 156 between the outer ends of which is mounted a shaft 157 adjacent a plurality of slots which extends through slots 158 formed in frame members 22 and 23. A plurality of knife discs 159 are carried and rotated by shaft 157 which is driven by a gear 160, which in turn is driven by a gear 54 whenever shaft 154 is rocked by rock arms 156 by appropriate manipulation of rock arm 155. A plurality of slots 161 are formed in the rear portion of table 26a whereby knife discs 159 protrude above the level of the table. Advancing block 44a is provided with an undercut recess 162 likewise to form a clearance for discs 159.

A meat which has been cut and sliced is received on chutes 163 and conveyed to the receiving container 164.

In Fig. 13 I show a modified form of cutter 32b having a laterally extending blade 32c. Cutters 32b may, if desired, be substituted for cutters 32.

The operation of the machine should be apparent from the foregoing description. The cutters 32 are reciprocated by the action of links 109 driven by eccentric cranks 108 mounted on shaft 107 and slice the meat 142 by vertical cuts as the meat is advanced by advancing block 44, which is advanced by cables 126 which are wound on the drums 125, the latter being actuated from ratchet wheel 120 from pawl 114 which reciprocates vertically on frame 80, the latter being actuated by link 77 connected to crank pin 76 on countershaft 63. When block 44 has been advanced to the extreme forward position, lug 136 engages pin 135 connected to pawl release lever 130 releasing pawl 114 from ratchet wheel 120 and the operator by releasing the latch lever 122 from ratchet wheel 121, the advancing table will be returned by the action of spring 50 which has been compressed during the forward movement of the table. In a similar manner the meat on table 26a is advanced and cut by the rotary knives 159 which, as set forth hereinabove, are adapted for cutting meat containing bones or analogous substances. During the cutting, as just described, the cross cutter frame 95 carrying knife 99 and saw 100 is reciprocating transversely by the action of crank link 93 being operated on vertical shaft 90, and the meat is cut transversely or into cubes each time the frame 80 is lowered and raised completing a transverse cut, the advancing frames 40 and 40a and blocks 44 and 44a are advanced by the action of pawl 114 and ratchet wheel 120 and pawl 114a and ratchet wheel 120a. The operation of the cutters 159 is selective, being operated only when gear 160 is in mesh with gear 54 which is effected by a manipulation of rock arm 155, as particularly set forth hereinabove.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A cutting machine as described comprising a frame, a horizontal track thereon, a table on said frame, a reciprocable pusher block on said track and table, a plurality of longitudinal cutters adjacent an end of said table, a transverse cutter adjacent said table end, a vertically reciprocable frame, said transverse cutter being supported in said vertically reciprocable frame, and actuating means for said cutters, said actuating means adapted to advance said pusher block during the actuation of said cutters, tension means tending to normally return the block to one position and resisting the advance of the block, and means actuated upon the block reaching a certain position to release the advancing means.

2. A cutting machine as described comprising a frame, a horizontal track thereon, a table on said frame, a reciprocable pusher block on said track and table, a plurality of longitudinal cutters adjacent an end of said table, a transverse cutter adjacent said table end, a vertically movable frame, said transverse cutter being supported in said vertically movable frame, actuating means for said cutters, means actuated by said frame during its cutting movement adapted to advance said pusher block during the actuation of said cutters, said means including a pawl on said frame and a ratchet wheel engageable therewith, and a locking ratchet for said ratchet wheel, spring means tending to normally return the block to its initial position and adapted to be compressed during the advance, and means actuated by the advance to release the locking latch whereby the spring means will return the block to its initial position.

3. A meat cutter comprising a frame having horizontal supporting portions with tables, pairs of tracks, pusher blocks having recesses longitudinally on the top thereof, a vertical frame portion divided into compartments, power means on the frame, a vertical oscillatory frame on the vertical frame adjacent one end of the table, means operable at will from the power means to actuate the oscillatory frame, horizontal movable cutters also operable from said power means and movable across the oscillatory frame, means for guiding the same and the oscillatory frame, means for advancing the pusher blocks upon each oscillation of the oscillatory frame, longitudinal cutters operatively carried by the horizontal frame portions and adapted to be actuated normally to the first mentioned cutters, means operated upon actuation of the last named cutters to store up energy for returning the pusher blocks and cutters to initial positions, means to release the latter means upon the limit of movement thereof being reached.

4. A meat cutter comprising a frame having horizontal supporting portions with tables, pairs of tracks, pusher blocks having recesses longitudinally on the top thereof, a vertical frame portion divided into compartments, power means on the frame, a vertical oscillatory frame on the vertical frame adjacent one end of the table, means operable at will from the power means to actuate the oscillatory frame, horizontal movable cutters also operable from said power means and movable across the oscillatory frame, means for advancing the pusher blocks upon each oscillation of the oscillatory frame, longitudinal cutters operatively carried by the horizontal frame portions and adapted to be actuated normally to the first mentioned cutters, means operated upon actuation of the last named cutters to store up energy for returning the pusher blocks and cutters to initial positions, means to release the latter means upon the limits of movements thereof being reached, said means to store up energy being actuable from the oscillatory frame, and adjustable means to limit the movements of the last named means.

5. A meat cutter comprising a frame having horizontal supporting portions with tables, pairs of tracks, pusher blocks having recesses longitudinally on the top thereof, a vertical frame portion divided into compartments, drive means on the frame, a vertical oscillatory frame on the vertical frame adjacent one end of the table, means including an operative connection operable from the drive means to actuate the oscillatory frame, control means therefor, horizontal movable cutters also operable from said drive means and movable across the oscillatory frame, means for advancing the pusher blocks upon each oscillation of the oscillatory frame, horizontal longitudinal cutters operatively carried by the horizontal frame portions and adapted to be actuated normally to the first mentioned cutters, means operated upon actuation of the last named cutters to store up energy for returning the pusher blocks and cutters to initial positions, means to release the latter means upon the limits of movements thereof being reached, said means to store up energy being actuable from the oscillatory frame, and adjustable means to limit the movements of the last named means.

JAMES A. ARVANITIS.